April 10, 1934.  C. SCHEIFELE  1,954,495
VEHICLE BODY
Filed July 11, 1932  3 Sheets-Sheet 1

Inventor
CHRIST SCHEIFELE.
By his Attorneys

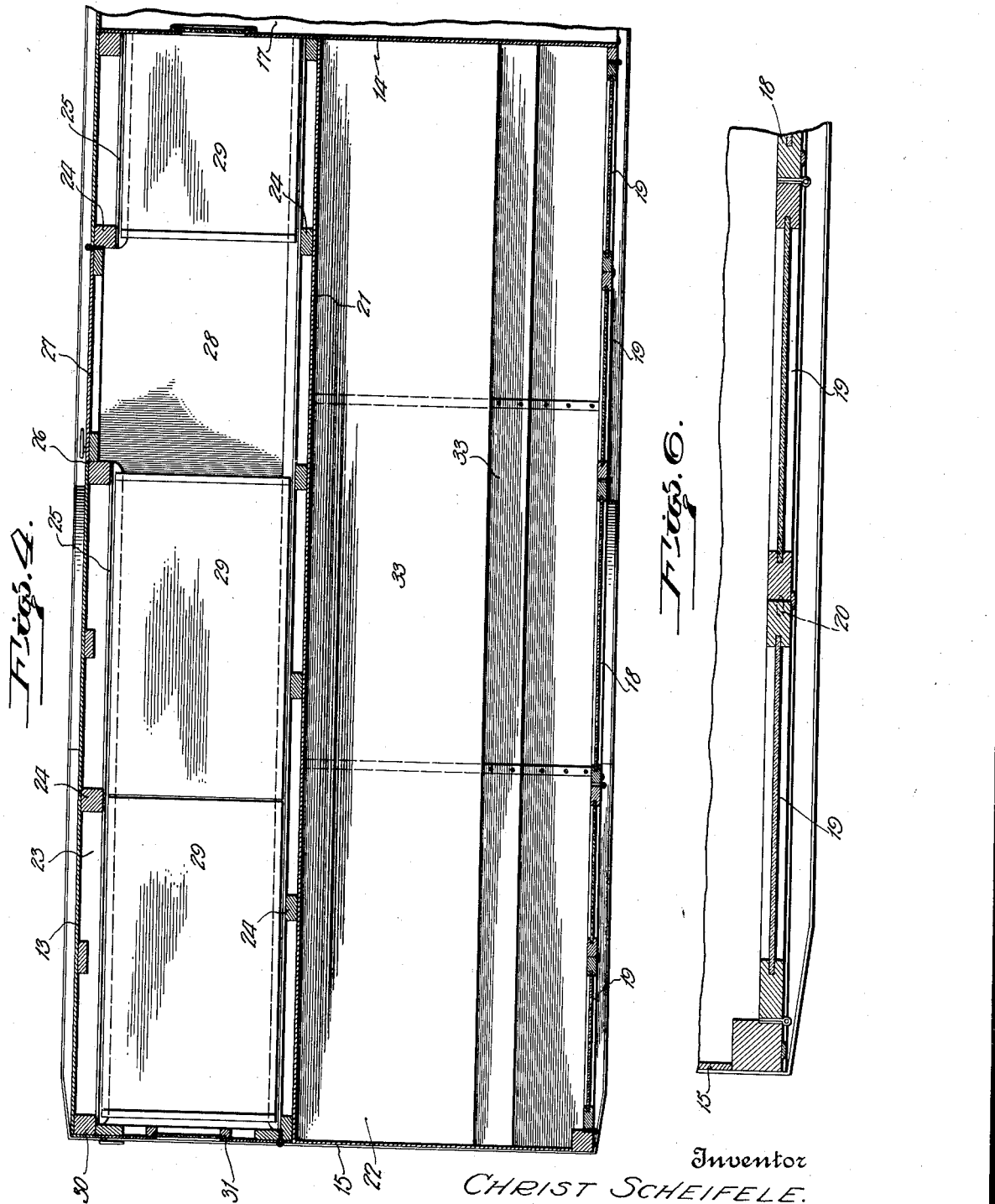

April 10, 1934.  C. SCHEIFELE  1,954,495
VEHICLE BODY
Filed July 11, 1932   3 Sheets-Sheet 3
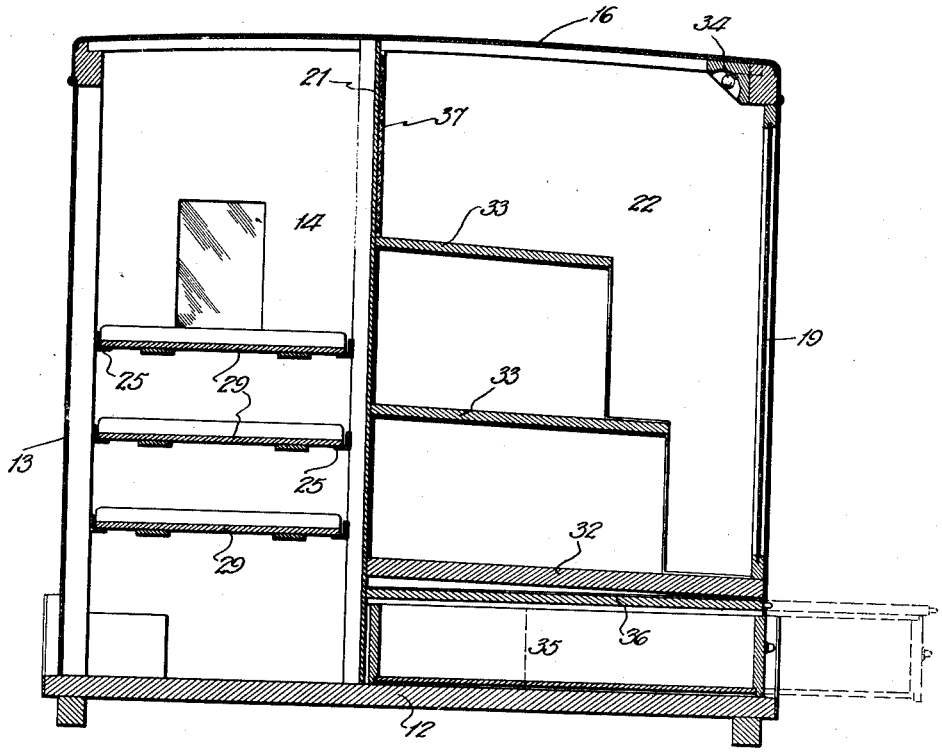
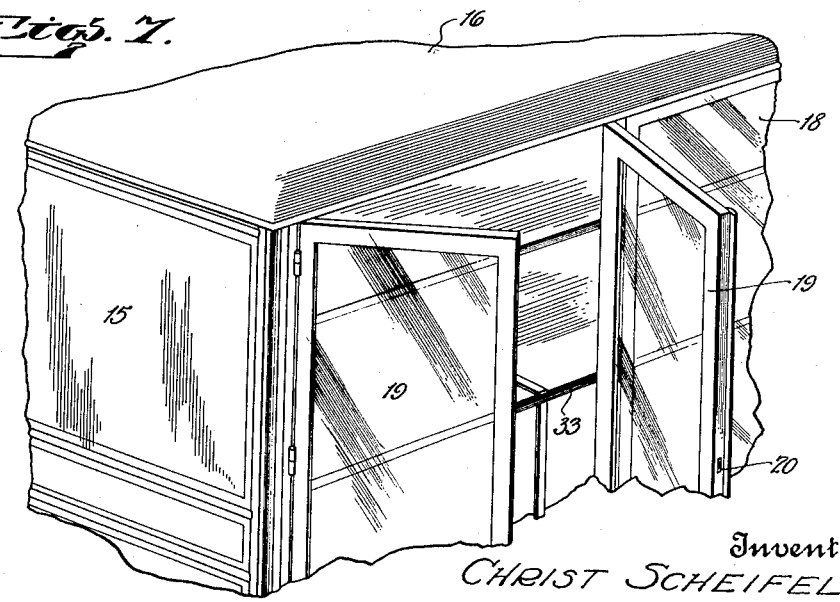
Inventor
CHRIST SCHEIFELE.
By his Attorneys Patented Apr. 10, 1934

1,954,495

UNITED STATES PATENT OFFICE 1,954,495

VEHICLE BODY

Christ Scheifele, Woodside, N. Y.

Application July 11, 1932, Serial No. 621,779

1 Claim. (Cl. 296—21)

This invention relates to improvements in vehicle bodies, and more particularly to an automobile body from which merchandise may be displayed and sold.

One of the features of the invention resides in a vehicle body construction by which articles of merchandise may be attractively displayed and readily dispensed to respectively induce and expedite the sale of the same.

Another feature is to provide a vehicle body which is divided longitudinally by a partition into separate compartments, the interior of one being visible from one side of the body to enable the display of merchandise, while the other compartment is concealed and in which additional merchandise may be stored but readily accessible through doors provided therein when desired.

A further object of the invention is the provision of a vehicle body embodying the above features which is simple, rigid, and inexpensive of construction.

Figure 1:
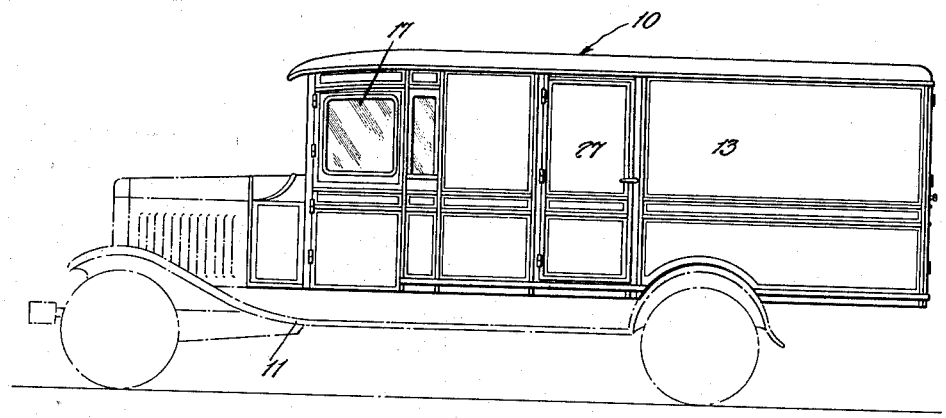
Figure 2:
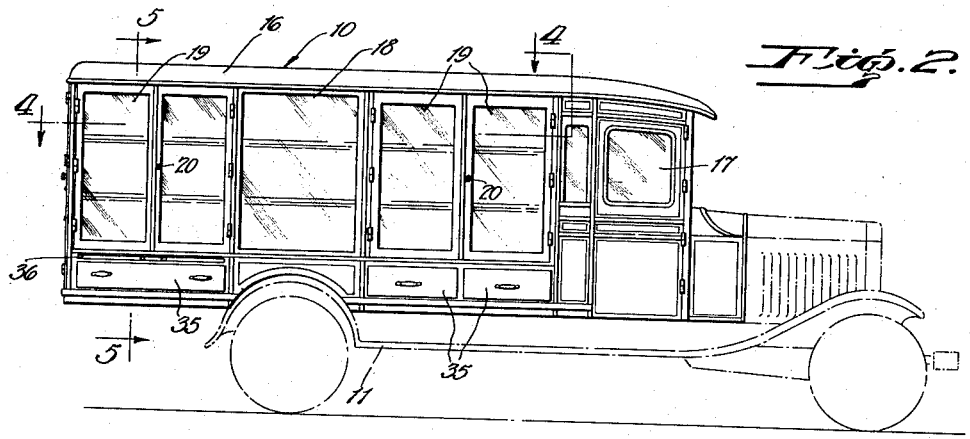
Figure 3:
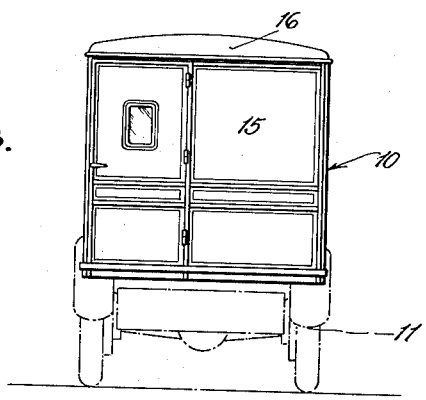

With these and other objects in view, the invention resides in the certain novel construction, combination and arrangement of parts, the essential features of which are hereinafter fully described, are particularly pointed out in the appended claim, and are illustrated in the accompanying drawings, in which:

Figure 1 is a side elevational view looking at one side of the vehicle body, the chassis of an automobile being shown in dot and dash lines, Figure 2 is a view similar to Figure 1, but looking at the opposite side, Figure 3 is a rear elevational view, Figure 4 is an enlarged detail horizontal sectional view on the line 4—4 of Figure 2, Figure 5 is an enlarged vertical transverse sectional view on the line 5—5 of Figure 2, Figure 6 is a detail horizontal sectional view through one set of glass doors, Figure 7 is a fragmentary perspective view showing the door in partially open position.

Referring to the drawings by reference characters, the numeral 10 designates my improved vehicle body in its entirety and is shown in Figures 1 to 3 inclusive in relation to the chassis 11 of an automobile. The said chassis being shown in dot and dash lines. The body 10 comprises a floor 12, a side wall 13 on the left hand side, a front end wall 14, rear end wall 15 and a roof or top wall 16. Forward of the front end wall 14 is a driver's compartment or cab 17 which is shut off from the interior of the body by the front end wall 14.

The right side of the body 10 or that side opposite to the closed side wall 13 has a glass transparent panel 18 mounted midway between the ends of the body while hingedly mounted on opposite sides of the fixed transparent panel 18 are sets of glass panel doors 19 and which when closed, coact with the panel 18 to provide a transparent side wall. The doors 19 of each set are held closed by a lock or latch mechanism 20.

Extending lengthwise of the interior of the body 10 from the rear end wall 15 to the front end wall 14 is a vertical partition or wall 21 which divides the interior of the body into a display compartment 22 and a storage compartment 23. Vertical studs or rails 24 rise upwardly within the compartment 23 to reinforce the side walls 13 and the partition wall 21 and fixedly supported thereon and extending lengthwise of the compartment, and sets of tracks or rails 25. A door opening 26 is provided in the side wall 13 adjacent the front end of the said wall and may be closed by a hinged door 27. The sets of tracks 25 terminate at the door opening 26 to provide a space 28 for a person entering through a door opening 26 to obtain access to the compartment 13. Slidable upon the sets of tracks 25 are trays or shelves 29 which are adapted to support articles of merchandise in storage. A door opening 30 is provided in the rear end wall 15 for access to the compartment 13 through the rear and which opening is closed by a hinged door 31. By reason of the position of the door openings 26 and 30, all portions of the shelf 29 within the compartment 13 may be reached. The trays or shelves 29 rearward of the opening 26 may be removed through the door opening 30 whereas the tray 29 forward of the opening 26 may be removed through the said door opening 26.

The compartment 22 is provided with an inclined bottom wall 32 disposed above the bottom 12 and in spaced relation with respect thereto, while extending outwardly toward the glass paneled side of the body and arranged in tier formation are shelves 33, the same also being inclined and arranged in stepped formation as best seen in Figure 5 of the drawings. Electric lamps 34 are mounted adjacent the roof 16 within the display compartment 22 for illuminating the contents of the compartment when necessary.

Slidably supported above the floor 12 and below the inclined floor 32 of the compartment 22 are drawers 35, there being one large drawer spanning the width of two of the glass doors 19 as best seen in Figure 2 of the drawings, while a pair of smaller drawers are respectively disposed beneath the doors 19 of the other set. A counter board 36 is slidably mounted between the large drawer 35 and the floor 32 and when the drawer 35 is pulled out together with the counter board 36, the said drawer acts as a support for the board which may serve the purposes of a counter when dispensing the merchandise contained with the display compartment 22. The drawers 35 may be utilized for the storing of merchandise or for supplies in the nature of bags, boxes and the like used in the dispensing of the displayed merchandise.

A mirror 37 is supported by the partition wall 21 within the display compartment 22 above the uppermost shelf 33 and serves to reflect light from the electric lamps 34 for ornamental purposes.

In use of a vehicle body of this construction, it will be appreciated that articles of merchandise may be placed upon the shelves 33 within the compartment 22 and the same displayed in a sanitary manner to persons positioned on the right hand or curb side of the said body. When a vehicle equipped with a body of this type is brought to a stop along the curb of a street, the passers-by along the side walk have a clear view of the merchandise and which may be dispensed by the operator of the vehicle by the opening of the doors 19. An additional supply of merchandise is stored in the compartment 14 upon the shelves 29 and is accessible through the doors 27 and 31 as previously explained.

The body has been constructed especially for the display and sale of bakery products, although any other line of merchandise may be displayed and sold from a body of this construction. The side wall 13 may be suitably paneled by molding as best seen in Figure 1 of the drawings, and if desired the name of the owner of the vehicle and his address and business may be painted thereon for advertising purposes.

While I have shown and described what I deem to be the most desirable embodiment of my invention, I wish it to be understood that various changes as come within the scope of the appended claim may be resorted to if desired.

Having thus described the invention, what I claim as new and desire to secure by Letters Patent is:—

A merchandise vending vehicle body having a floor, front and rear end walls, a single side wall, a partition wall extending lengthwise of said body from the front end wall to the rear end wall to divide the interior thereof into an enclosed merchandise storage compartment on one side, and a merchandise display compartment on the opposite curb side thereof, transparent panels closing the side of the body opposite said side wall, door means accessible from the curb side of said body for obtaining access to said display compartment, and door means accessible from the exterior of said body for facilitating access to the interior of said enclosed compartment, whereby the vehicle body may be loaded with merchandise, a portion of the merchandise being visibly displayed in said display compartment for sale and the remainder in said storage compartment for transfer to said display compartment to replenish the merchandise dispensed therefrom through the sale thereof.

CHRIST SCHEIFELE.